May 9, 1961  J. L. LAUER  2,983,661
PRODUCTION OF CARBON DISULFIDE
Filed July 16, 1959
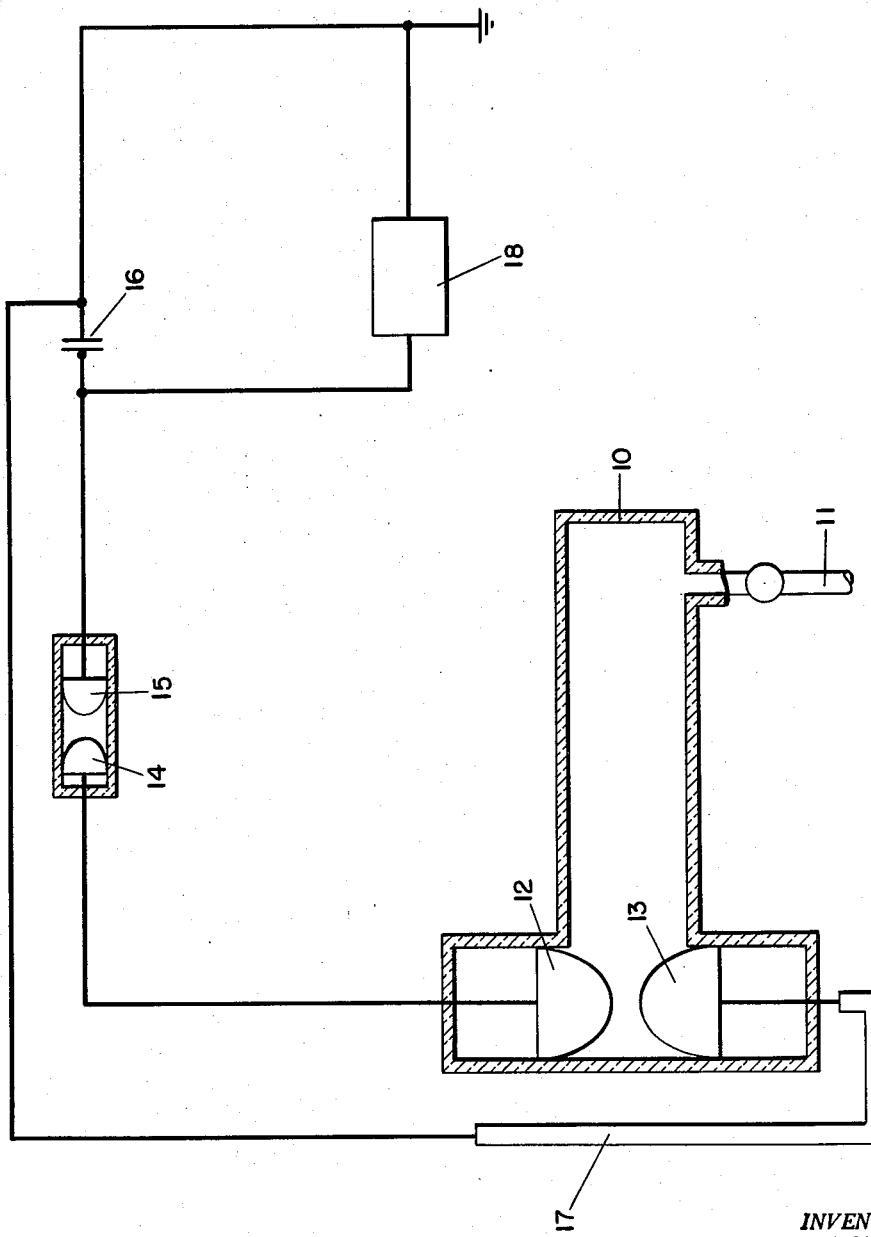
INVENTOR.
JAMES L. LAUER
BY Robert O. Spindle
ATTORNEY

2,983,661
PRODUCTION OF CARBON DISULFIDE

James L. Lauer, Philadelphia, Pa., assignor to Sun Oil Company, Philadelphia, Pa., a corporation of New Jersey Filed July 16, 1959, Ser. No. 827,647

2 Claims. (Cl. 204—156)

This invention relates to a novel method for the production of carbon disulfide, and more particularly to the simultaneous application of electric and magnetic forces to produce a high intensity shock wave in a medium of gaseous reactants whereby a chemical reaction takes place.

In the past the electric arc has been applied to gaseous media in conjunction with a magnetic field, for the purpose of spreading out the arc. The present invention is directed to the production of a shock wave by electrical means in conjunction with the application of a directional magnetic force, the latter serving to drive the shock wave. When the electrical potential discharges in the form of a spark the reactant gas mixture between the electrodes is suddenly heated to a high temperature and a rapid expansion results with a consequent rapid increase in pressure. This generates a shock wave which propagates through the reactor. At substantially the same time as the spark discharges, a magnetic field is applied thus adding an additional push to the shock wave. The effect of the additional push is to create higher temperatures, more expansion and higher pressures which favor the chemical reaction taking place in the mixture of reactant gases.

The magnetic field is preferably applied in such a way that the shock wave is driven along a confined tube so that pressure and temperature effects are concentrated.

In order that those skilled in the art may more fully understand the nature of my invention, it will be more fully described in connection with the attached schematic drawing which discloses a preferred embodiment.

In the drawing reaction tube 10 is provided with valved line 11 leading to suitable means for regulating the pressure in tube 10, such as a vacuum pump (not shown). A pair of metal electrodes 12 and 13, the metal being stainless steel or nickel, preferably the latter, are located at one end of tube 10 so that a spark gap is provided between them. A second pair of electrodes 14 and 15, and a capacitor 16 are connected in series with electrodes 12 and 13, the breakdown voltage of the gap between electrodes 14 and 15 being higher than that of the gap between electrodes 12 and 13. Ground lead 17, which is connected to electrode 13, is formed of heavy brass strap, and passes upwardly in close juxtaposition to the gap between electrodes 12 and 13. Capacitor 16 is energized by a high voltage power supply 18.

In the operation of the apparatus, reactor 10 is filled with a mixture of methane and hydrogen sulfide, and the pressure within reactor 10 is adjusted to the desired value. The $CH_4$:$H_2S$ ratios in the reaction mixture should be within the range of about 4:1 to 1:4. The best results with respect to carbon disulfide appearing at a ratio of 1:2. Pressures are preferably low, from about 60 to 125 mm. of mercury absolute, although atmospheric or higher pressures may be used.

Capacitor 16 is then charged by power supply 18 to a voltage sufficient to break down the gap between electrodes 14 and 15.

Since the breakdown voltage between electrodes 12 and 13 is less than that between electrodes 14 and 15, the spark will jump the gap between electrodes 12 and 13. When this happens, the gas between the electrodes is suddenly heated to a high temperature and a rapid expansion results. This rapid expansion generates a shock wave which propagates along the length of reactor 10. Simultaneously, current flowing through ground lead 17 sets up a magnetic field which exerts a force in the same direction as the travel of the shock wave. The combination of the electric discharge and the magnetic drive both operating directionally in the reactor serves to apply forces and conditions to the reactant gases resulting in higher conversions than would be possible when using electric discharge alone or in applying the magnetic force in a random direction.

Table I sets forth results utilizing apparatus similar to that described in the drawing. The power supply 18 was a direct current 30,000 volt, 200 microampere unit. The capacitor 16 was a 25,000 volt, 1.6 microfarad, 0.025 microhenry unit. With this equipment it was possible to jump the spark gap between electrodes 14 and 15 about once every 30 seconds. The breakdown voltage of the gap between electrodes 14 and 15 was about 21,000 volts.

TABLE I

| Run No | 8071 | 73 | 75 | 77 | 79 | 81 | 83 | 85 | 87 |
|---|---|---|---|---|---|---|---|---|---|
| No. of Shocks | 5 | 5 | 20 | 5 | 20 | 5 | 20 | 5 | 20 |
| Total Energy, Watt-Hrs | .36 | .36 | 1.44 | .36 | 1.44 | .36 | 1.44 | .16 | .64 |
| Charge, Mol Percent $CH_4$ | 32.8 | 33.6 | 33.3 | 65.1 | 66.7 | 66.0 | 65.5 | 36.4 | 28.3 |
| Charge, Mol Percent $H_2S$ | 67.1 | 66.3 | 66.6 | 34.7 | 33.1 | 33.9 | 34.4 | 63.4 | 61.3 |
| Initial Pressure, mm. Hg | 60.4 | 120.8 | 121.0 | 63.7 | 63.6 | 121.1 | 122.7 | 61.6 | 60.7 |
| Pressure Increase, mm. Hg | 6.0 | 9.1 | 25.4 | 8.9 | 24.0 | 11.6 | 34.1 | 3.7 | 12.1 |
| Yield, Mol Percent S Charged: | | | | | | | | | |
| $H_2S$ | 78.5 | 85.8 | 63.3 | 71.6 | 45.0 | 85.5 | 61.1 | 91.3 | 67.3 |
| $CS_2$ | 11.5 | 7.5 | 10.6 | 9.7 | 23.0 | 7.0 | 16.2 | 7.3 | 22.4 |
| S | 11.2 | 5.8 | 17.4 | 22.2 | 33.0 | 7.8 | 24.5 | 0.2 | 9.6 |

Other products produced by the reaction include ethylene, acetylene, diacetylene, hydrogen and carbon in relatively small amounts.

I claim:

1. A process for the production of carbon disulfide which comprises subjecting a gaseous mixture of methane and hydrogen sulfide confined in a closed reactor to a series of discontinuous direct current electric spark discharges to produce shock waves and substantially simultaneously to an intermittent magnetic field thereby applying a combination force to the reactants.

2. A process for the production of carbon disulfide which comprises subjecting a gaseous mixture of methane and hydrogen sulfide in a $CH_4$:$H_2S$ ratio within the range of about 1:3 to 3:1 confined in a closed reactor to a series of discontinuous direct current electric spark discharges to produce shock waves and substantially simultaneously to an intermittent magnetic field acting perpendicular to the spark discharge to increase the velocity of the shock wave along the length of a closed reaction tube thereby enhancing the production of carbon disulfide.

References Cited in the file of this patent

UNITED STATES PATENTS

| | | |
|---|---|---|
| 1,902,384 | Steinbuch et al. | Mar. 21, 1933 |
| 2,745,861 | Bodine | May 15, 1956 |
| 2,832,666 | Hertzberg et al. | Apr. 28, 1958 |

FOREIGN PATENTS

| | | |
|---|---|---|
| 5,688 | Great Britain | of 1904 |
| 16,636 | Great Britain | of 1911 |

OTHER REFERENCES

Landshoff: Magnetohydrodynamics (April 1957), pages 76–91.